US011883702B2

(12) United States Patent
Kobayashi et al.

(10) Patent No.: US 11,883,702 B2
(45) Date of Patent: Jan. 30, 2024

(54) FOAM FIRE EXTINGUISHING AGENT

(71) Applicant: YAMATO PROTEC CORPORATION, Tokyo (JP)

(72) Inventors: Wataru Kobayashi, Inashiki-gun (JP); Yuki Takatsuka, Inashiki-gun (JP); Shogo Tomiyama, Inashiki-gun (JP)

(73) Assignee: YAMATO PROTEC CORPORATION, Osaka (JP)

( * ) Notice: Subject to any disclaimer, the term of this patent is extended or adjusted under 35 U.S.C. 154(b) by 0 days.

(21) Appl. No.: 17/908,355

(22) PCT Filed: Feb. 3, 2021

(86) PCT No.: PCT/JP2021/003952
§ 371 (c)(1),
(2) Date: Aug. 31, 2022

(87) PCT Pub. No.: WO2021/176935
PCT Pub. Date: Sep. 10, 2021

(65) Prior Publication Data

US 2023/0070948 A1 Mar. 9, 2023

(30) Foreign Application Priority Data

Mar. 6, 2020 (JP) ................................ 2020-038502

(51) Int. Cl.
*A62D 1/00* (2006.01)
*A62D 1/02* (2006.01)

(52) U.S. Cl.
CPC ......... *A62D 1/0007* (2013.01); *A62D 1/0071* (2013.01)

(58) Field of Classification Search
None
See application file for complete search history.

(56) References Cited

U.S. PATENT DOCUMENTS 4,683,004 A * 7/1987 Goddard .............. A62D 1/0071 424/47
5,215,676 A * 6/1993 Stone ....................... C11D 1/62 510/504
5,942,552 A * 8/1999 Cox ......................... A62D 3/02 521/65
2003/0010507 A1* 1/2003 Greiner ................ A62D 1/0078 169/44

FOREIGN PATENT DOCUMENTS

CN 104815412 A 8/2015
CN 104858983 * 8/2015
(Continued)

OTHER PUBLICATIONS

CN 108576035 A: English Language Abstract (Year: 2018).*
(Continued)

*Primary Examiner* — Joseph D Anthony
(74) *Attorney, Agent, or Firm* — WHDA, LLP

(57) ABSTRACT

The present invention provides a foam fire extinguishing agent that can fulfill predetermined performances without containing any fluorine-based compounds. The foam fire extinguishing agent of die present invention is characterized by containing 0.2 to 3.0% by mass of cationic surfactant, 0.2 to 5.0 by mass of anionic surfactant and water for a total of 100% by mass.

6 Claims, 1 Drawing Sheet

(56) References Cited

FOREIGN PATENT DOCUMENTS

| | | | | |
|---|---|---|---|---|
| CN | 104858986 | A | * | 8/2015 |
| JP | 57-34873 | A | | 2/1982 |
| JP | 58-50971 | A | | 3/1983 |
| JP | 2001-79108 | A | | 3/2001 |
| JP | 2007-25731 | A | | 2/2007 |
| JP | 2018-122291 | A | | 8/2018 |
| SU | 1128962 | A | * | 12/1984 |

OTHER PUBLICATIONS

International Search Report dated Apr. 6, 2021, issued in counterpart International Application No. PCT/JP2021/003952 (3 pages).

* cited by examiner

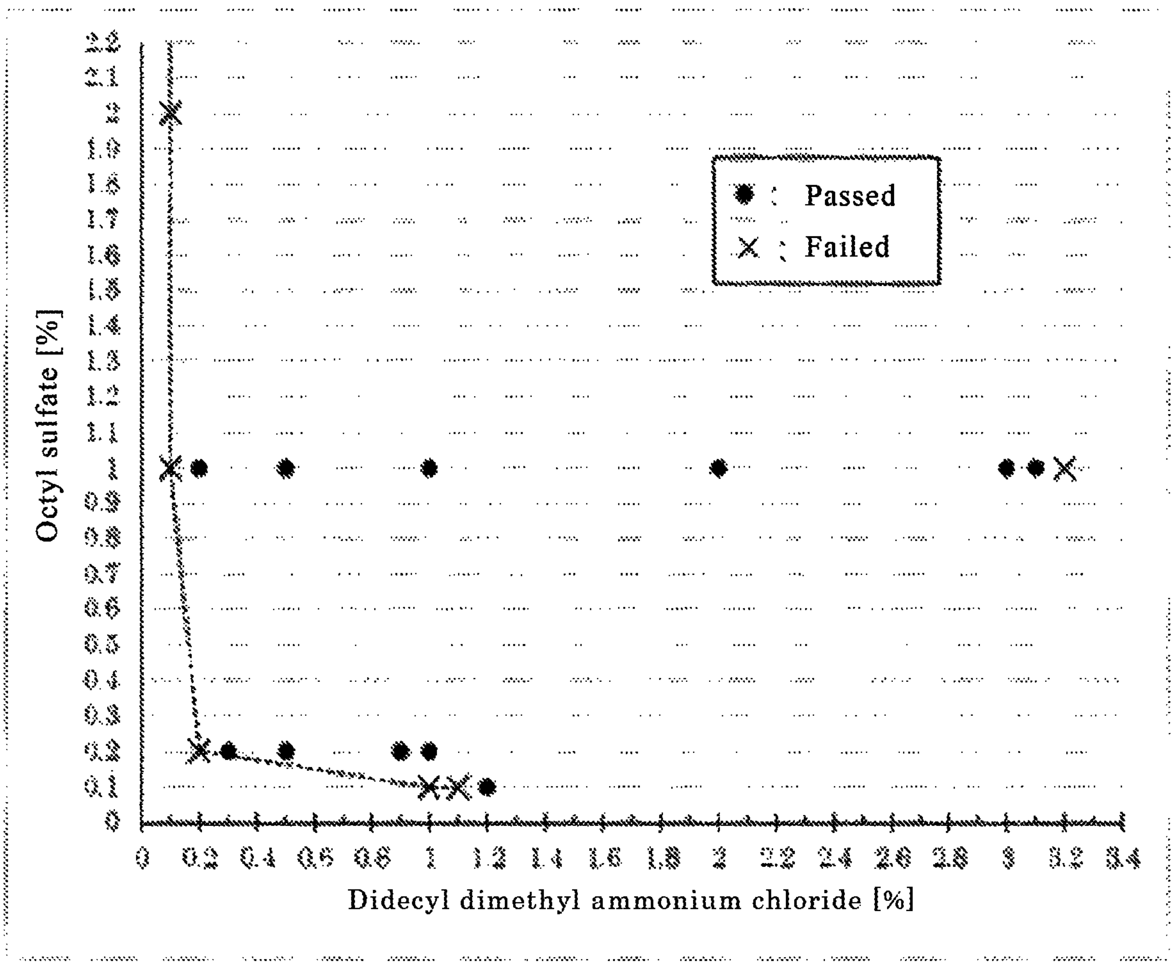
Passed
Failed
Octyl sulfate [%]
Didecyl dimethyl ammonium chloride [%]

FOAM FIRE EXTINGUISHING AGENT

TECHNICAL FIELD

The present invention relates to a foam fire extinguishing agent, and particularly relates to a fluorine-free foam fire extinguishing agent that does not contain any fluorine-based compounds, and that forms a film for suppressing vapor on a water-insoluble liquid.

BACKGROUND TECHNOLOGY

An aqueous film foam fire extinguishing agent is mainly used against fire caused by flammable liquids falling under class 4 of hazardous materials, and is supplied in a foam state. When this is used for fire caused by a water-insoluble flammable liquid, while the agent is restored (is reduced) to a liquid state from a foam state, an aqueous film is formed on the flammable liquid. Because this aqueous film suppresses generation of flammable vapor from the flammable liquid, fire is extinguished.

Now, in order to form the aqueous film, low surface tension of the aqueous film foam fire extinguishing agent is required but other than this, various performances as a fire extinguishing agent, such as fulfilling predetermined foaming performance, not being dissolved into oil, having resistance to heat and components not being separated or precipitated throughout a long term, are required. Therefore, the aqueous film foam fire extinguishing agent has a problem that requires to fulfill these various performances in a balanced manner while reducing the surface tension.

In order to fulfill such requirement, as a conventional aqueous film foam fire. extinguishing agent, for example, a surfactant containing a fluorine-based compound is used as one of components as proposed in Patent Literature 1 (Japanese Patent Application Laid-Open No. 2007-25730 (for example, Patent Literature 1).

PRIOR ART DOCUMENT

Patent Literature

[Patent Literature 1] Japanese Patent Application Laid-Open No. 2007-25731

SUMMARY OF THE INVENTION

Problem to be Solved by the Invention

However, recently, due to the influence of Stockholm Convention on Persistent Organic Pollutants (POPs Treaty), there are restrictions on manufacturing and using organic fluorine compounds, such as perfluorooctanesulfonic acid (PFOS), perfluorooctanoic acid (PFOA) and perfluorohexane sulfonic acid (PFHxS). and their related substances.

Then, the objective of the present invention is to provide a foam fire extinguishing agent that can fulfill predetermined performances without containing any fluorine-based compounds.

Means for Solving the Problem

In order to solve the problem mentioned above, the inventors continued to conduct tests and studies, and discovered that a fire extinguishing agent containing respective predetermined quantities of a non-fluorine-based cationic surfactant and a non-fluorine-based anionic surfactant would be able to fulfill performances as an aqueous film foam fire extinguishing agent without containing any fluorine-based compounds, and completed the present invention.

In other words, the foam fire extinguishing agent of the present invention is characterized by containing 0.2 to 3.0% by mass of cationic surfactant.

0.2 to 5.0% by mass of anionic surfactant, and water for a total of 100% by mass.

In the foam fire extinguishing agent of the present invention, the cationic surfactant is preferably at least one of dioctyl dimethyl ammonium chloride, octyl ethyldithethyl ammonium ethosulfate, octyl decyl dimethyl ammonium chloride, didecyl dimethyl ammonium chloride, dilauryl dimethyl ammonium chloride and didecyl methylpoly (1 or 2) oxyethylene ammonium propionate. Further, the anionic surfactant is preferably at least one of pentyl sulfate, octal sulfate, decyl sulfate and lauryl sulfate.

Effect of the Invention

According to the present invention, a foam fire extinguishing agent that can fulfill predetermined performances without containing any fluorine-based compounds can be provided.

BRIEF DESCRIPTION OF DRAWINGS

FIG. 1 is a graph showing whether a foam fire extinguishing agent gassed or failed an aqueous film test.

MODE FOR CARRYING OUT THE INVENTION

Hereafter, the foam fire extinguishing agent relating to a typical embodiment of the present invention will be explained in detail with reference to the drawing, provided, however, that the present invention shall not be limited to these.

The foam fire extinguishing agent relating to the present embodiment contains 0.2 to 3.0% by mass of the cationic surfactant and 0.2 to 5.0% by mass of the anionic surfactant. With such formulation, even though no fluorine-based compound is contained, excellent results can be obtained in an aqueous film test, and other performances (such as oleophobic, heat resisting and foaming performances) are also compatible. As a factor to obtain the excellent results with the formulation above, it is considered possible that combined crude materials have a comparatively great hydrophobic group to form complex, and it causes reduction of surface tension.

Further, more preferably, it is preferable to contain 0.5 to 1.0% by mass of the cationic surfactant and 1.0 to 3.0% by mass of the anionic surfactant.

Out of these, it is preferable to select the cationic surfactant from any of dioctyl dimethyl ammonium chloride, octyl ethyldimethyl ammonium ethosulfate, octyl decyl dimethyl ammonium chloride, didecyl dimethyl ammonium chloride, dilauryl dimethyl ammonium chloride and didecyl methylpoly (1 or 2) oxyethylene ammonium propionate.

Further, it is preferable to select the anionic surfactant from any of pentyl sulfate, octyl sulfate, decyl sulfate and lauryl sulfate. The most preferable combination contains didecyl dimethyl ammonium chloride as the cationic surfactant and octyl sulfate as the anionic surfactant.

Now, if the range is less than 0.2% by mass of the cationic surfactant and less than 0.2% by mass of the anionic surfactant, this agent does not pass the aqueous film. test, and required performances cannot be obtained. Further, if the content of the cationic surfactant exceeds 3.0% by mass, a solution will be separated and will not be established as an extinguishing agent. For the anionic surfactant, any upper limit of the concentration that may cause failure of performances cannot be discovered, but if this is added by exceeding 5.0% by mass, cost effectiveness cannot be expected.

As mentioned above, even though the foam fire extinguishing agent of the present embodiment is blended without containing any fluorine-based compounds, it is conformable to the aqueous film test, which have been conventionally difficult, and, other performances are also excellent. Further, this agent excels in availability of its crude materials.

EXAMPLE

Adding 10% by mass of butyl carbitol, a cationic surfactant (didecyl dimethyl ammonium chloride) and an anionic surfactant octyl sulfate by respective quantities Shown in Table 1, 26 types of foam fire extinguishing agent samples (aqueous foam solutions) were prepared, and an aqueous film test to be mentioned below Was conducted and coefficients of diffusion were measured.

Furthermore, the butyl carbitol is a solvent that is blended into an actual extinguishing agent, as well. Further, components, such as ethylene glycol, are added into the actual extinguishing agent in addition to an organic solvent, such as carbitol, the cationic. surfactant, the anionic surfactant and water.

[Test]

1. Aqueous Film Test

Each foam extinguishing sample was diluted in a measuring flask with water to 100% by mass, and an aqueous film test was conducted by using these samples.

Procedures are as follows:

(1) Pour 600 ml of cyclohexane at 20±1° C. of solution temperature into a stainless container with 11.4 cm of internal diameter and 13 cm of internal height.

(2) Place 200 ml of generated foam evenly on a cyclohexane oil surface.

(3) Place a conical stainless wire gauze (plain-woven 80 mesh) so as to allow its tip to be immersed into cyclohexane, and leave it to stand for one minute.

(4) Bring a tip of flame of a propane torch using a nozzle of a low-pressure gas. welding machine closer to 13±3 mm above the cyclohexane oil surface for one second. Four seconds later, continue the operation to bring the torch closer to the oil surface for another second, and repeat this operation six times in total.

(5) In the case of causing ignition by the flame brought closer to the oil surface and spontaneously extinguishing within one minute, continue the operation in (4) above in four seconds after the extinguishment.

In the aqueous film test above, whether the test was passed or failed was determined, and, conditions of the solutions were observed.

For the criteria for determination, when a foam stock solution of aqueous films in an aqueous solution was foamed and a flame was brought closer to a generated aqueous film, if the aqueous film was not ignited and would not continuously burn, the sample was considered as passed (Symbol ○ in Table 1).

Table 1 and FIG. 1 show results,

2. Measurement Method for Coefficient of Diffusion

A coefficient of diffusion of each foam fire extinguishing agent was measured with the following procedures:

(1) Pour a measured quantity of each foam fire extinguishing agent into a 100 ml measuring cylinder using a measuring pipette, add water or synthetic seawater to produce 100 ml of aqueous foam solution. Stir the foamed solution well and leave it to stand for 30 minutes or longer.

(2) Measure surface tension of cyclohexane at 20° C. using a ring method or a plate method in accordance with ISO 304.

(3)Measure surface tension of the aqueous foamed solution at 20° C. as similar to (2) above.

(4) Measure interfacial tension of cyclohexane and the aqueous foamed solution using the ring method or the plate method.

(5) Calculate the coefficient of diffusion using the following expression:

Coefficient of diffusion=(surface tension of cyclohexane)−(surface tension of aqueous foamed solution)−(interfacial tension of cyclohexane and aqueous foamed solution)

The results are shown in Table 1.

TABLE 1

| No. | Didecyl dimethyl ammonium chloride | Octyl sulfate | Aqueous film test | Coefficient of diffusion | Solution condition |
|---|---|---|---|---|---|
| 1 | 0.10% | 1% | x | −0.71 | Nothing abnormal detected |
| 2 | 0.20% | 1% | ○ | 0.45 | Nothing abnormal detected |
| 3 | 0.50% | 1% | ○ | 0.62 | Nothing abnormal detected |
| 4 | 1% | 1% | ○ | 1.34 | Nothing abnormal detected |
| 5 | 2% | 1% | ○ | 1.37 | Nothing abnormal detected |
| 6 | 3% | 1% | ○ | 1.38 | Nothing abnormal detected |
| 7 | 3.10% | 1% | ○ | 1.48 | Nothing abnormal detected |
| 8 | 3.20% | 1% | | | Separated |
| 9 | 6.40% | 2% | ○ | 1.64 | Nothing abnormal detected |
| 10 | 6.50% | 2% | | | Separated |
| 11 | 1% | 0.10% | x | −1.36 | Nothing abnormal detected |
| 12 | 1.10% | 0.10% | x | −0.88 | Nothing abnormal detected |
| 13 | 1.20% | 0.10% | ○ | 0.35 | Nothing abnormal detected |
| 14 | 20% | 0.10% | ○ | 1.14 | Nothing abnormal detected |
| 15 | 0.20% | 0.20% | x | −0.27 | Nothing abnormal detected |
| 16 | 0.30% | 0.20% | ○ | 0.10 | Nothing abnormal detected |
| 17 | 0.50% | 0.20% | ○ | 0.18 | Nothing abnormal detected |
| 18 | 0.90% | 0.20% | ○ | 0.14 | Nothing abnormal detected |
| 19 | 1.0% | 0.20% | ○ | 0.15 | Nothing abnormal detected |
| 20 | 20% | 0.20% | ○ | 0.34 | Nothing abnormal detected |

TABLE 1-continued

| No. | Didecyl dimethyl ammonium chloride | Octyl sulfate | Aqueous film test | Coefficient of diffusion | Solution condition |
|---|---|---|---|---|---|
| 21 | 0.10% | 1% | x | −0.71 | Nothing abnormal detected |
| 22 | 0.10% | 2% | x | −0.15 | Nothing abnormal detected |
| 23 | 0.10% | 4% | x | −0.27 | Nothing abnormal detected |
| 24 | 0.10% | 10% | x | −0.26 | Nothing abnormal detected |
| 25 | 0.20% | 1% | ○ | 0.45 | Nothing abnormal detected |
| 26 | 0.20% | 0.90% | x | −0.08 | Nothing abnormal detected |

According to the results shown in Table 1 and FIG. 1, it has been confirmed that the foam fire extinguishing agents relating to the present invention excel in an aqueous film performance and can preferably demonstrate an extinguishing function in the case ©f containing 0.2 to 3.0% by mass of the cationic surfactant and 0.2 to 5.0% mass of the anionic surfactant. Further, it has been confirmed that it is preferable to have a positive coefficient of diffusion.

The invention claimed is:

1. A foam fire extinguishing agent, consisting of:
0.5 to 1.0% by mass of a cationic surfactant,
1.0 to 5.0% by mass of an anionic surfactant,
water, and
optionally an organic solvent;
wherein the foam fire extinguishing agent does not comprise any compound containing a fluorine atom.

2. The foam fire extinguishing agent according to claim 1, wherein
the cationic surfactant is at least one of dioctyl dimethyl ammonium chloride, octyl ethyldimethyl ammonium ethosulfate, octyl decyl dimethyl ammonium chloride, didecyl dimethyl ammonium chloride, dilauryl dimethyl ammonium chloride and didecyl methylpoly (1 or 2) oxyethylene ammonium propionate.

3. The foam fire extinguishing agent according to claim 1, wherein
the anionic surfactant is at least one of pentyl sulfate, octyl sulfate, decyl sulfate and lauryl sulfate.

4. The foam fire extinguishing agent according to claim 1, wherein a coefficient of diffusion is positive.

5. The foam fire extinguishing agent according to claim 1, wherein the foam fire extinguishing agent is housed in a stainless container.

6. The foam fire extinguishing agent according to claim 1, wherein the foam fire extinguishing agent, consisting of:
the cationic surfactant,
the anionic surfactant, and
water.

* * * * *